UNITED STATES PATENT OFFICE.

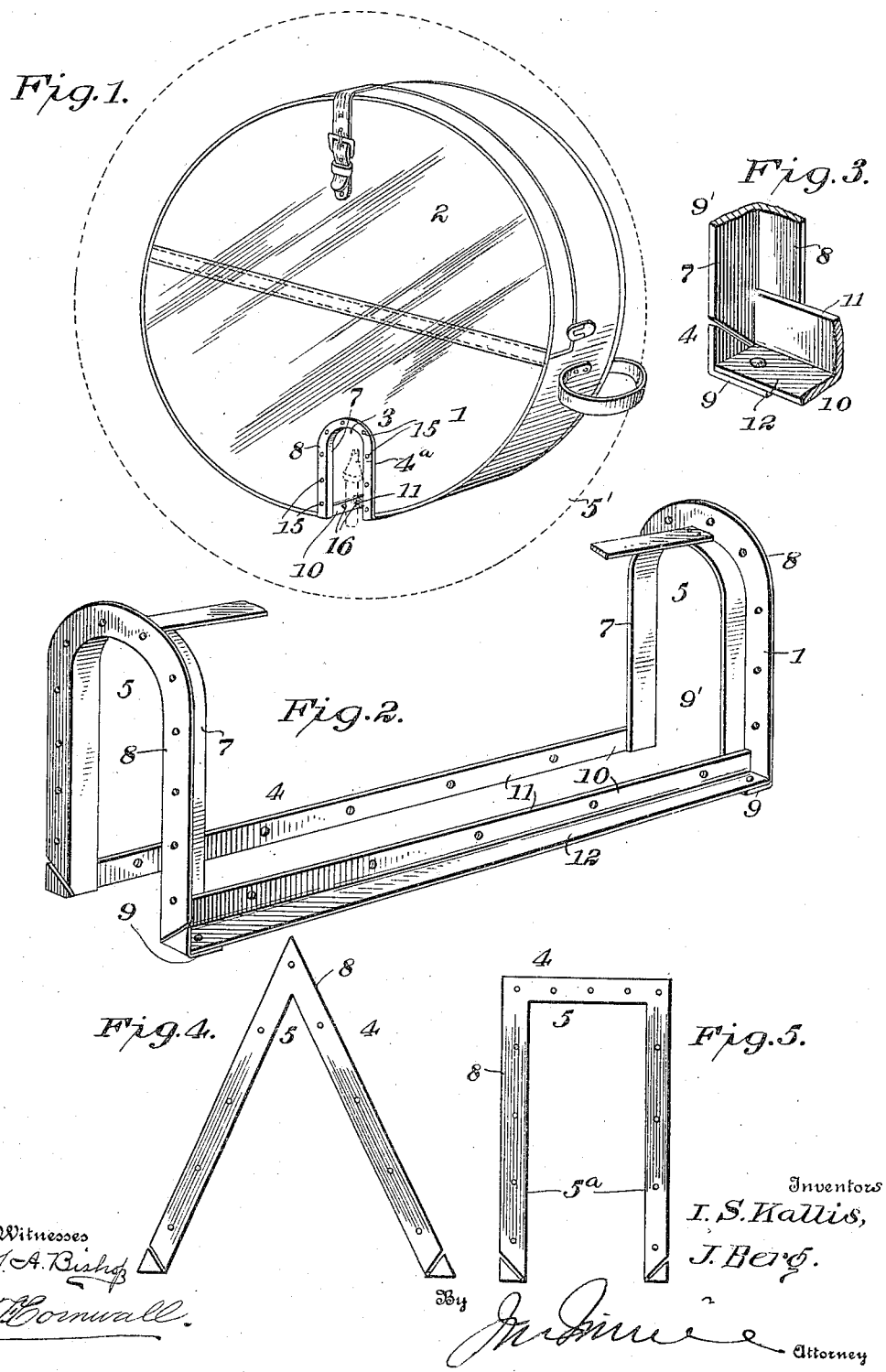

ISIDORE S. KALLIS AND JOSEPH BERG, OF NEW YORK, N. Y., ASSIGNORS, BY MESNE ASSIGNMENTS, TO LAFAYETTE B. GLEASON, OF DELHI, DELAWARE.

TRUNK.

966,451.

Specification of Letters Patent.

Patented Aug. 9, 1910.

Application filed May 20, 1909. Serial No. 497,343.

*To all whom it may concern:*

Be it known that we, ISIDORE S. KALLIS and JOSEPH BERG, citizens of the United States, residing at New York, in the county of New York and State of New York, have invented certain new and useful Improvements in Trunks, of which the following is a specification.

This invention relates primarily to what is now generally known in the trade as automobile trunks.

It is customary to carry an extra tire on automobiles, which is usually supported on the side of the car. Within the inner diameter of this extra tire the trunk is carried, and considerable difficulty has been experienced by automobilists, in finding when using the extra tire for demountable rim tires, the valve would be mashed or otherwise injured caused by contact with the walls of the trunk.

It is the object of the present invention to provide means on the trunk to prevent this difficulty, and yet permit of the trunk and tire being related as heretofore.

The invention also comprehends improvements in the specific details of construction and arrangement of parts to be hereinafter described, and particularly pointed out in the claims.

In the drawing: Figure 1, is a perspective view of a trunk equipped with the invention, a tire being shown in dotted lines. Fig. 2, is a detail perspective view of the invention. Fig. 3, is a detail view to illustrate the construction. Figs. 4, and 5, are views of slightly different forms of the invention.

1, indicates a circular automobile trunk having a hinged door 2, and formed in its periphery (bottom) with a notch 3, in which fits the valve 4ª, of an automobile tire 5′, when the parts are related on a car. In order to provide substantial rigidity at the point where the notch 3 is formed, a frame 4, is provided. This frame consists of two arch shaped end members 5—5, formed of angle iron to produce horizontal flanges 7, and face flanges 8. The bottoms of the legs of the end members are also formed into flanges 9, to support the two parallel side connecting bars 10, 10. The bars 10—10, are of angle formation to provide vertical flanges 11, and horizontal flanges 12, the latter being riveted to the flanges 9, when the frame is assembled for use. As stated the end members 5—5 are of arch formation, as clearly shown in the drawings, to permit the insertion and withdrawal of the tire trunk.

The form of the invention may be changed, as shown in Figs. 4, and 5. In Fig. 4, the frame is A-shaped in cross section, while in Fig. 5, the upper part of the end members are at right angles to the legs 5ª.

The frame is inserted in the notch 3, and rivets 15, are passed through the flanges 8, and 9, and rivets 16, are passed through the flanges of the side parallel connecting bars. This construction effectually strengthens the trunk adjacent the notch 3, and yet sufficient space is formed to permit free passage of the valve when positioning the trunk over the tire. The width of the notch is sufficient to permit slight lateral movement of the trunk or the tire surrounding the same, so as not to cause the walls of the notch to contact with and bend or in anywise injure the said valve.

The invention is quite essential in this art, and will successfully accomplish the purpose for which it is designed.

The construction is simple and by reason of the arrangement of the flanges, is extremely durable.

What we claim is:

1. An automobile trunk formed at its edge with a notch, and a frame reinforcing the edges of the walls of the notch.

2. An automobile trunk formed with a notch in its edge, a frame having flanges and engaging the edges of the walls of the notch.

3. An automobile trunk formed at its edge with a notch, a frame reinforcing the edges of the trunk adjacent the notch, said frame comprising two end members connected by cross bars.

4. An automobile trunk formed at its edge with a notch, a frame for reinforcing the edges of the trunk adjacent the notch, said frame comprising two end members formed of angle iron connected by cross bars formed of angle iron.

In testimony whereof we affix our signatures in presence of two witnesses.

ISIDORE S. KALLIS.
JOSEPH BERG.

Witnesses:
JOHN IMIRIE,
HELGE OTT MURRAY.